Oct. 20, 1970   A. G. PUGH ET AL   3,534,428
DE-LABELLING APPARATUS
Filed Jan. 22, 1969   10 Sheets-Sheet 1
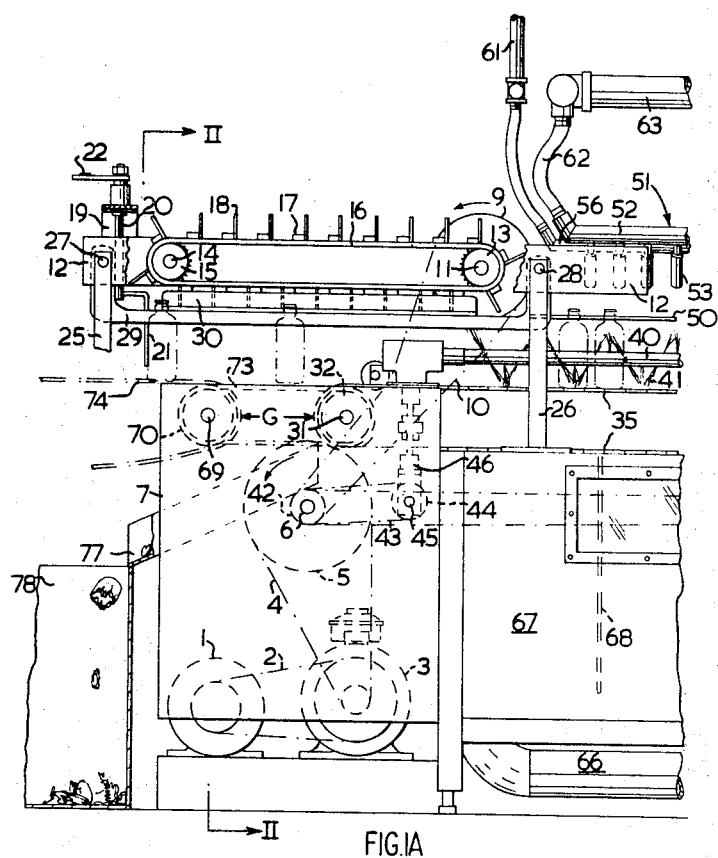
FIG.IA
INVENTORS
ARTHUR G. PUGH
AND
ERNEST J. HODGETTS
BY: Cushman, Darby & Cushman
ATTORNEYS Oct. 20, 1970  A. G. PUGH ET AL  3,534,428
DE-LABELLING APPARATUS
Filed Jan. 22, 1969  10 Sheets-Sheet 5

Inventors
Arthur G. Pugh
and
Ernest J. Hodgetts
BY: Cushman, Darby & Cushman
ATTORNEYS Oct. 20, 1970  A. G. PUGH ET AL  3,534,428

DE-LABELLING APPARATUS

Filed Jan. 22, 1969  10 Sheets-Sheet 8

INVENTORS
ARTHUR G. PUGH
AND
ERNEST J. HODGETTS
BY: CUSHMAN, DARBY & CUSHMAN
ATTORNEYS

United States Patent Office 3,534,428
Patented Oct. 20, 1970

3,534,428
DE-LABELLING APPARATUS
Arthur G. Pugh, West Vancouver, British Columbia, and Ernest J. Hodgetts, Edmonton, Alberta, Canada, assignors to Molson Industries Limited-Les Industries Molson Limited, Montreal, Quebec, Canada
Filed Jan. 22, 1969, Ser. No. 793,138
Claims priority, application Canada, Dec. 4, 1968, 036,831
Int. Cl. B60c 1/08
U.S. Cl. 15—302                                    8 Claims

ABSTRACT OF THE DISCLOSURE

The invention relates to apparatus for removing labels from bottles by a mixture of hot water and steam in combination with rotary abrading means, the apparatus also being provided with means for sorting unbroken bottles from broken bottles and removing the latter from the path of travel of the unbroken bottles.

---

Figure 1B:
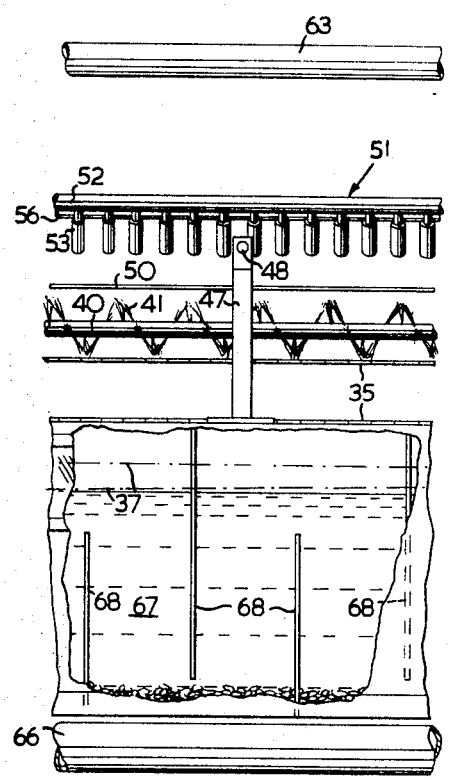

This invention relates to an improved apparatus for removing labels from bottles.

Returnable and refillable beverage bottles must undergo a washing and sterilization process upon return to the converter. During this process, the bottle pass through a combined bottle washer and sterilizer during which time they are subjected to a heated mixture of caustic soda and water for an approximate period of three-quarters of an hour. Moreover, during this time, an attempt is made to soak the labels and adhesive from the bottles.

However, this has had the disadvantage that the bottle washer has tended to become clogged owing to an accumulation of paper pulp resulting from the soaking of the labels. A further disadvantage has been that the paper pulp and the caustic soda have, together, formed a scale which has adhered to the heating coils of the washer thereby destroying the efficiency of the latter and bringing about a needless shutting-down of the machine in order to descale the coils. A further disadvantage has been that, not withstanding the care taken to see that the bottles coming from the washer are free of foreign matter, minute particles of paper fibre from the labels have tended to adhere to the interior of the bottles. Such minute particles of fibre, although not deleterious to the beverage do, nevertheless, engender suspicion on the part of the consumer that the beverage is contaminated. Such a situation is abhorrent to the converter owing to the ever present possibility of a damaging word of mouth rumour that the bottled product is contaminated, and the consequent loss in goodwill and sales can be of great magnitude. As will be appreciated therefore, the complete removal of labels and adhesive therefor from bottles is of the utmost importance to the converter.

Now it is recognized that proposals have, heretofore, been made to provide de-labelling machines but, for one reason or another, none of these prior proposals have adequately overcome the above difficulties. For instance, it is known to subject bottles, before they enter the bottle washer, to high-pressure jets of either hot or cold water but even these have failed entirely to remove all paper and adhesive and, hence, it is known for bottles still to enter the bottle washer with fragments of labels still adhering to them. In addition, prior de-labelling apparatus has relied upon oscillation of the bottles, one with another and during their path of travel, to present the labels to the high-power water jets. This has, of necessity, been a hit-and-miss method and there has been no positive guarantee that a label will, in fact, be presented to a jet. In addition, the trend in labels today is toward a foil label which, although attractive in appearance, is far more difficult to remove than a paper label. Consequently, it is almost impossible to remove foil labels merely by subjecting them to jets of water alone.

Furthermore, and with such prior machines, no means have been provided for automatically sorting whole bottles from broken bottles prior to entry into the bottle washer. In the main, such sorting has had to be done manually by an operator stationed between the de-labelling apparatus and the bottle washer. The wages of such an operator have, necessarily, increased the costs of production and there has been no guarantee that the operator has observed and removed every broken bottle before it has reached the bottle washer.

Hence, it is the object of the present invention to provide an apparatus which will automatically sort broken bottles from unbroken bottles and remove the labels and adhesive from the latter in a positive manner before such unbroken bottles enter the bottle washer.

According to one broad aspect, the present invention relates to apparatus for removing labels from the exterior of bottles, said apparatus including: (a) first and second unbroken bottle conveying means; (b) a broken bottle disposal station in advance of said second conveying means; (c) said first conveying means conveying unbroken bottles past said station for delivery to said second conveying means; (d) means for applying a mixture of hot water and steam to the exterior of said unbroken bottles to soften the labels and adhesive therefor; and (e) scraping means frictionally engaging the exterior of the bottles to remove said labels and adhesive; said hot water, steam and scraping means operating during conveyance of said unbroken bottles by said second means.

Figure 1C:
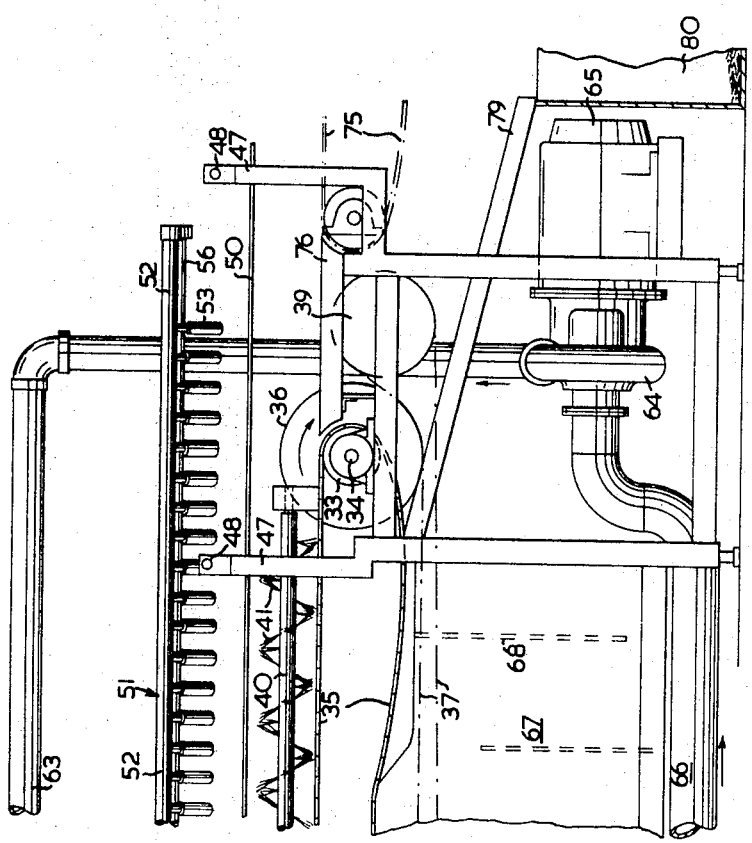
Figure 2:
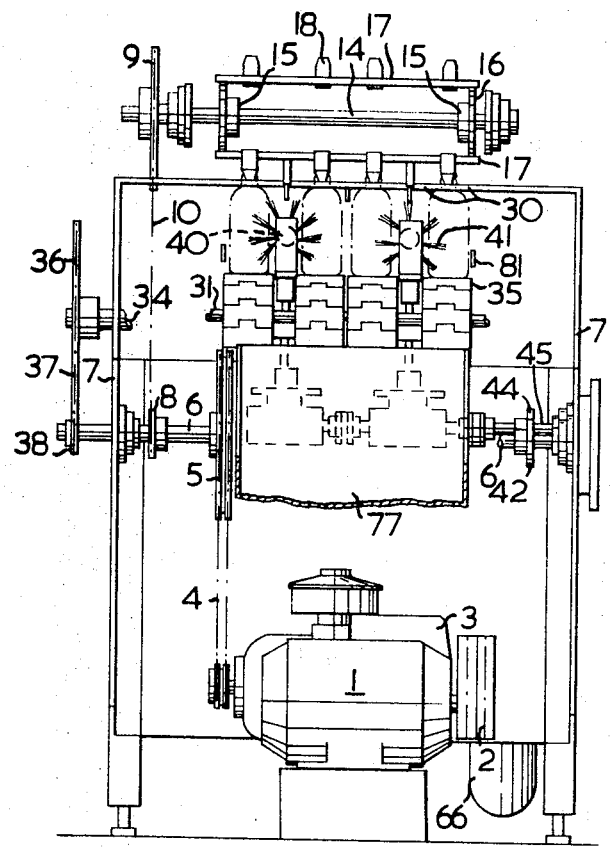
Figure 3A:
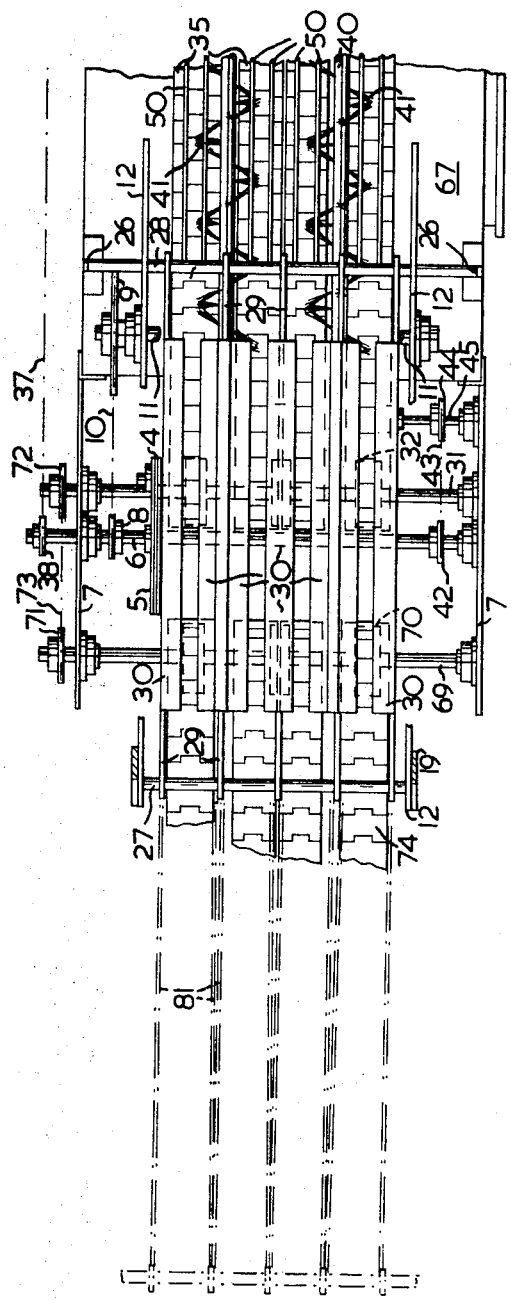
Figure 3B:
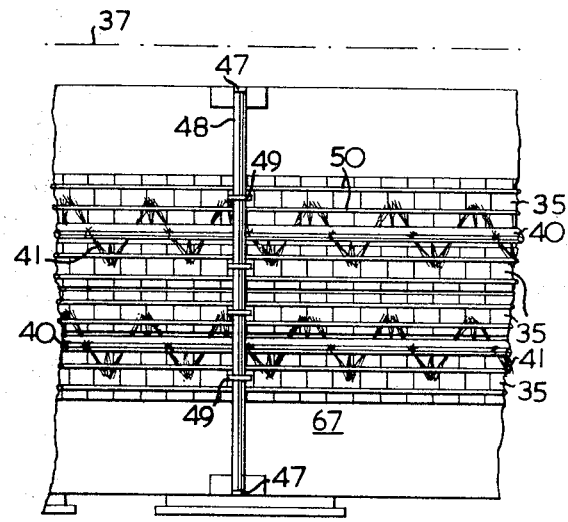
Figure 3C:
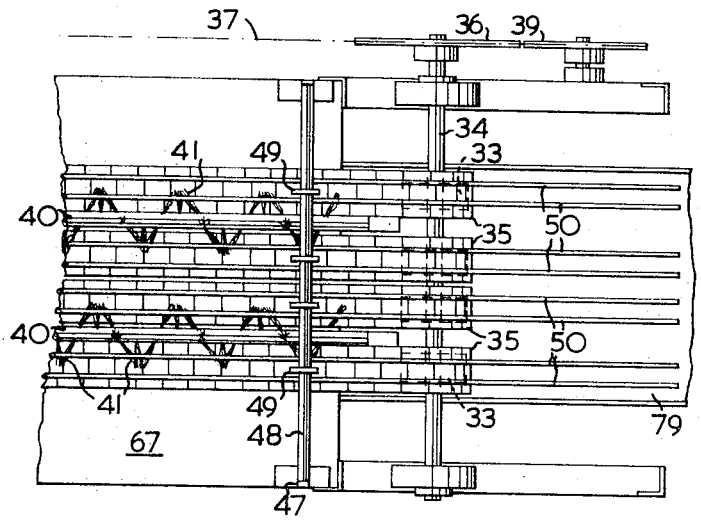
Figure 4:
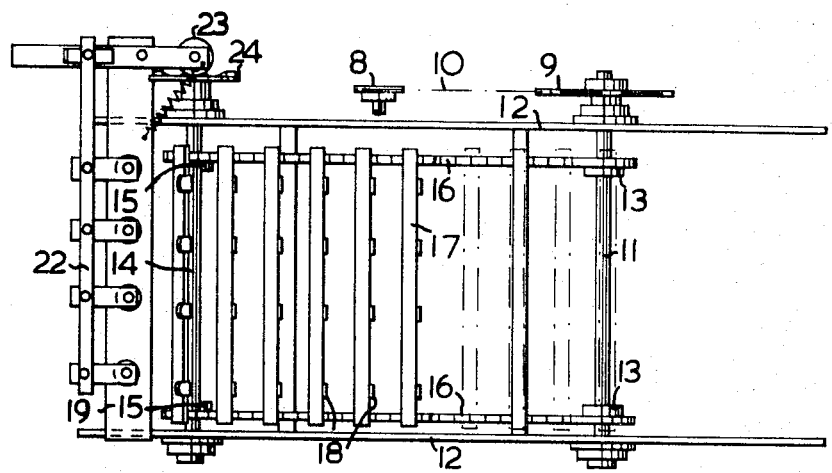
Figure 5:
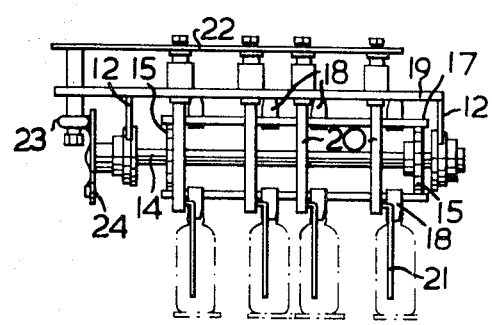
Figure 6:
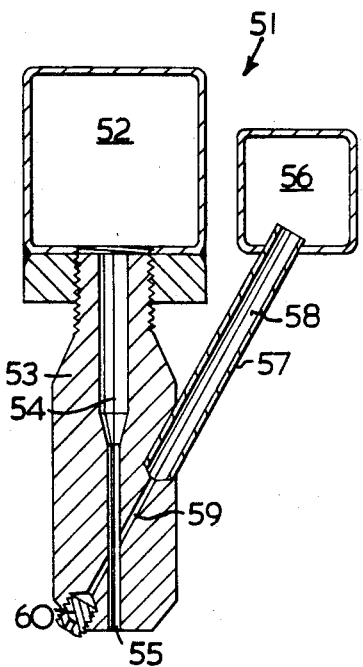
Figure 7:
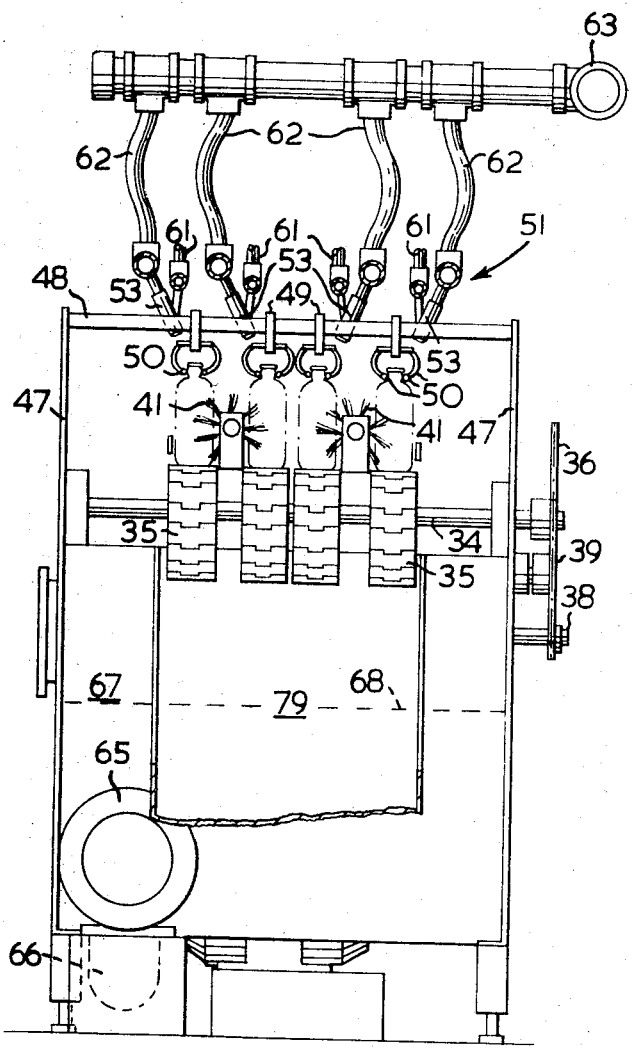

The invention is illustrated in the accompanying drawings in which:

FIGS. 1A–1C represent a part sectional side view of the apparatus;
FIG. 2 is a section taken on the line II—II of FIG. 1A;
FIGS. 3A–3C represent a plan of the apparatus but with certain portions removed for clarity;
FIG. 4 is a plan view of one such removed portion;
FIG. 5 is an end view of FIG. 4;
FIG. 6 is a detail view; and
FIG. 7 is an end elevation of FIG. 1C.

MAIN DRIVE AND DRIVE TO FIRST UNBROKEN BOTTLE CONVEYING MEANS

Referring to the drawings and in particular to FIG. 1A, the apparatus includes a motor 1 connected by a belt-drive 2 to a hydraulic transmission 3 which, by means of a chain drive 4, imparts drive to a drive wheel 5 mounted on a cross-shaft 6 extending between a pair of side frame members 7.

A drive wheel 8 (see FIGS. 2 and 3A), located adjacent wheel 5 and also mounted on shaft 6, serves to drive a wheel 9 by means of a chain drive 10, said wheel 9 being mounted adjacent one end of a second cross-shaft 11 extending between a pair of upper side plates 12.

Mounted on the cross-shaft 11 and between the side plates 12, are a pair of spaced-apart sprocket wheels 13 (see FIG. 1A), and located adjacent the other end of each of the side plates 12 and mounted therebetween is a further cross-shaft 14 carrying a pair of complementary spaced-apart sprocket wheels 15, each pair of sprocket wheels 13, 15 being connected by means of chain drives 16.

FIRST UNBROKEN BOTTLE CONVEYING MEANS

The chain drives 16 carry a plurality of spaced transverse bars 17 each having a plurality of projecting spring fingers 18.

Secured to the side plates 12 is a saddle 19 carrying a plurality of depending shafts 20 the lower end of each of which has an angulated bottle pusher-rod 21 projecting therefrom, said shafts being capable of oscillation within their mountings on the saddle 19. The upper ends of the shafts 20 are connected together by means of a transverse cam lever 22 which is connected to a cam follower 23 (see FIGS. 4 and 5) cooperating with a cam disc 24 mounted on the outer end of cross-shaft 14.

Two pairs of upwardly projecting straps 25, 26 (FIGS. 1A and 3A) serve, respectively, to support cross-bars 27, 28 which, in turn, carry a plurality of hangers 29 supporting a plurality of laminated phenolic guides 30 each pair of which serves to define a bottle lane. The lane defined by each pair of guides 30 is of a width slightly less than the diameter of the neck-ring of a bottle so that when a bottle enters such a lane the guides 30 in each pair thereof will suspend a bottle by its neck-ring as is shown in FIGS. 1A and 2 and, as will be seen from the drawings, the guides 30 are located beneath the chain drive 16 and extend longitudinally in the same direction for substantially the same length as said drive 16. The bars 17, fingers 18 and guides 30 therefore constitute first unbroken bottle conveying means.

DRIVE TO SECOND UNBROKEN BOTTLE CONVEYING MEANS

Located beneath the guides 30 and mounted on a transverse shaft 31 are a plurality of sprocket wheels 32 (see FIGS. 1A and 3A) and, as will be seen more clearly from FIG. 1C, a plurality of similar sprocket wheels 33 are mounted on a transverse shaft 34, a bottle supporting plate belt 35 passing over each pair of complementary sprocket wheels 32, 33, said plate belt 35 constituting second unbroken bottle conveying means.

A drive wheel 36 in FIG. 1C is mounted on one end of shaft 34 and is driven by means of a chain drive 37 cooperating with a further drive wheel 38 (see FIG. 3A) mounted on one end of shaft 6 and an idler wheel 39 located adjacent drive wheel 36. Hence, the drive to the plate belt 35 is via the chain drive 37.

SCRAPING MEANS

Rotatably mounted above the plate belt 35 is a pair of longitudinally extending shafts 40 (see FIGS. 1A–1C) each carrying a helical wire brush 41. Drive is imparted to each shaft 40 via a sprocket wheel 42 (FIGS. 1A and 3A) carried by shaft 6 and a chain drive 43 cooperating with a sprocket wheel 44 mounted on cross-shaft 45 which, in turn, drives a pair of right-angled gear drive 46 which bring about rotation of the brush shafts 40.

A further plurality of upwardly projecting straps 47 (FIGS. 1B and 1C) are provided which carry cross-bars 48 having depending hangers 49 each of which carries a pair of bottle guide rods 50 defining a guideway for the neck of a bottle when the latter is received from the guides 30 and during conveyance by the plate belt 35.

HOT WATER AND STEAM MEANS

Located above the guide rods 50 are a plurality of combined hot water and steam units indicated generally at 51 in FIGS. 1A–1C. Each unit includes a longitudinally extending hot water conduit 52 having a nozzle 53 (see FIG. 6) provided with a central bore 54 leading to a bore 55 of reduced diameter. Each unit also includes a steam circuit 56 having a nozzle 57 provided with a central bore 58 leading to a bore 59 of reduced diameter terminating in the bore 55 of each hot water conduit 52, each nozzle 53 being provided with a clean-out plug 60, each steam conduit 56 being connected, via pipe 61 (FIG. 1A), to any suitable source of steam pressure.

Each hot water conduit 52 is connected, via pipes 62 and 63 (FIG. 1A), to a pump 64 (FIG. 1C) operated by an electric motor 65. Pump 64 is connected, via a pipe 66, to a tank 67 (FIGS. 1A–1C) located beneath the plate belt 35 and provided with interior baffle plates 68 (FIG. 1B). In addition, an entry (not shown) is provided in the upper surface of the tank 67 to permit the entrance of used hot water into said tank for recirculation or to discharge into the sewer, the baffle plates 68 assisting in the separation of sediment from the water.

The left-hand end of the machine, as viewed in FIG. 1A, also serves as the mounting for a transverse shaft 69 carrying a plurality of sprocket wheels 70. As will be seen from FIG. 3A, one end of shaft 69 carries a drive wheel 71 which is connected to drive wheel 72, fast on one end of shaft 31, by means of a chain drive 73, the sprocket wheels 70 thereby driving a plate belt 74.

The right-hand end of the machine, as viewed in FIG. 1C, leads to a plate belt 75 which can, if desired, be driven from the de-labelling apparatus, a bridge 76 being provided for forming a contiguous surface between the plate belts 35 and 75.

As will be seen from FIG. 1A, an angulated chute 77 leading to a collection bin 78 is located between the plate belts 35 and 74 and is provided for the collection or broken bottles. Similarly, a further angulated chute 79, leading to a collection bin 80 is located beneath the right-hand end (as viewed in FIG. 1C) of the plate belt 35 and bridge 76 and is provided for the collection of paper pulp resulting from the removal of the labels.

It is also advantageous to provide depending plates 81 (see FIG. 3A) above plate belt 74 and in advance of the de-labelling apparatus so as to marshal the bottles into pre-defined lanes.

OPERATION

The bottles are received by plate belt 74 from a normal uncaser (not shown) and the plates 81 marshal them into pre-defined lanes, in the present case, four in number. Preferably, the bottles are carried by plate belt 74 in an upright position.

As the bottles approach saddle 19, and due to cam plate 24, follower 23 and lever 22, oscillation of shafts 20 will occur bringing about movement of the bottle pusher rods 21 which will urge the bottles towards the spring fingers 18 in timed sequence. Movement of chain drive 16 causes the spring fingers 18 to urge the bottles (as is shown in FIG. 2) into the lanes defined by the guides 30 and where unbroken bottles will be suspended by their neck rings as they are conveyed over the gap G (see FIG. 1A) existing between the plate belts 74 and 35. If, on the other hand, the bottle is broken, it will not be picked up by the fingers 18 and guides 30 but will be urged along the path of travel by the next succeeding and unbroken bottle. In due course, the broken bottle will be caused to be discharged over the right-hand end (as viewed in FIG. 1A) of the plate belt 74 into the gap G, on to the chute 77 and into the collection bin 78, said gap G constituting a broken bottle disposal station in advance of the plate belt 35 or second unbroken bottle conveying means.

When the unbroken bottles leave the lanes defined by the guides 30 they will be deposited on plate belt 35 with their neck rings supported and guided by the guide rods 50 and as is shown in FIG. 7. Inasmuch as each helical wier brush 41 is located between each pair of outer lanes, each said brush will be caused frictionally to engage the outer surfaces of the bottles in its associated lanes and during conveyance of said bottles by the plate belt 35, abrasion of the bottles by the brushes combined with the speed of the plate belt 35 causing them to rotate so that their entire circumference will be presented to the brushes as, of course, will the labels.

Concurrently, a mixture of steam at approximately 50 p.s.i.g. and hot water at approximately the same pressure will be tangentially projected on to the bottles, the combined effect bringing the water temperature up to approximately 140° F. at increased velocity. The mixture, coupled with the abrading effect of the brushes, ensures that even foil labels and the adhesive therefor will be completely removed from the bottles by the time that they have reached the right-hand end (as viewed in FIG. 1C) of the apparatus. This apparatus has operated at speeds in excess of 500 bottles per minute without any appreciable loss in efficiency of label removal.

It will be appreciated that whereas helical wire brushes have been described and illustrated, nylon or similar brushes can be used just as effectively.

As the plate belt 35 continues to move, it will deposit the resultant paper or foil pulp from the labels into chute 79 and, eventually, into the collection bin 80.

As the de-labelled and scoured bottles leave their lanes at the right-hand (as viewed in FIG. 1C) of the apparatus, they will be urged by the succeeding bottles in their respective lanes over the bridge 76 and on to the plate belt 75 which will convey them to the bottle washer proper (not shown).

The embodiments of the invention in which an exclusive property or privilege is claimed are defined as follows:

1. Apparatus for removing labels from the exterior of bottles, said apparatus including:
    (a) first and second unbroken bottle conveying means;
    (b) a broken bottle disposal station in advance of said second conveying means;
    (c) said first conveying means conveying unbroken bottles past said station for delivery to said second conveying means;
    (d) means for applying a mixture of hot water and steam to the exterior of said unbroken bottles to soften the labels and adhesive therefor; and
    (e) scraping means frictionally engaging the exterior of the bottles to remove said labels and adhesive;
said hot water, steam and scraping means operating during conveyance of said unbroken bottles by said second means.

2. Apparatus according to claim 1 wherein said station is located beneath said first conveying means, the latter being so arranged that unbroken bottles are conveyed over said station in suspension.

3. Apparatus according to claim 2 wherein said first conveying means includes a plurality of travelling members which urge said bottles towards said second conveying means in spaced timed sequence with one another.

4. Apparatus according to claim 3 wherein said hot water, steam and scraping means are associated with said second conveying means.

5. Apparatus according to claim 4 wherein said scraping means is constituted by at least one rotary brush contacting the otuer periphery of the bottles during conveyance by said second conveying means.

6. Apparatus according to claim 5 wherein the hot water and steam means include hot water and steam headers located above said rotary brush and arranged to direct said mixture tangentially toward the bottles.

7. Apparatus according to claim 6 including means for recirculating said hot water and for separating sludge and pulp from the water before re-use.

8. Apparatus according to claim 7 including drive means for imparting drive to both conveying means and said scraping means.

References Cited
UNITED STATES PATENTS

| 1,817,014 | 8/1931 | Meyer et al. | 15—60 |
| 2,761,799 | 9/1956 | Schroeder | 134—104 |

FOREIGN PATENTS

| 1,015,338 | 9/1957 | Germany. | |

ROBERT W. MICHELL, Primary Examiner

U.S. Cl. X.R.

15—60; 134—104